United States Patent
Yamazaki

(10) Patent No.: US 6,563,603 B1
(45) Date of Patent: May 13, 2003

(54) IMAGE PROCESSOR, IMAGE FORMING APPARATUS, IMAGE FORMING SYSTEM COMPRISING THESE APPARATUSES, COMPUTER-READABLE RECORDING MEDIUM THAT RECORDS IMAGE FORMING PROGRAM, AND IMAGE FORMING METHOD

(75) Inventor: Tsutomu Yamazaki, Sagamihara (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/420,413

(22) Filed: Oct. 19, 1999

(30) Foreign Application Priority Data

Oct. 19, 1998 (JP) .......................... 10-297031

(51) Int. Cl.⁷ ............................... G06K 15/00
(52) U.S. Cl. ........................ 358/1.9; 358/3.1
(58) Field of Search ................. 358/1.9, 1.15, 358/514, 517

(56) References Cited

U.S. PATENT DOCUMENTS

| | | | |
|---|---|---|---|
| 5,923,824 A | * 7/1999 | Yokomizo | 395/109 |
| 6,023,595 A | * 2/2000 | Suzuki | 399/31 |
| 6,198,550 B1 | * 3/2001 | Toyoda | 358/514 |
| 6,211,974 B1 | * 4/2001 | Haneda | 358/527 |
| 6,233,069 B1 | * 5/2001 | Buhr | 358/519 |
| 6,243,171 B1 | * 6/2001 | Haneda | 358/1.15 |
| 6,462,836 B1 | * 10/2002 | Sato | 358/3.01 |

FOREIGN PATENT DOCUMENTS

| | | | |
|---|---|---|---|
| JP | 59174828 | * 10/1984 | G03B/27/73 |
| JP | 09-027908 | 1/1997 | |
| JP | 09083797 | * 3/1997 | B41J/2/44 |

* cited by examiner

*Primary Examiner*—Jerome Grant, II
(74) *Attorney, Agent, or Firm*—Burns, Doane, Swecker & Mathis, L.L.P.

(57) ABSTRACT

An image forming system includes an image forming apparatus; an image processor, the image processor includes instruction element for requesting image processing parameter adjustment data from the image forming apparatus; a receiver for receiving image processing parameter adjustment data from the image forming apparatus, and image processor for performing adjustment of an image processing parameter based on the image processing parameter adjustment data received by the receiver. The image forming apparatus includes a data creating device for creating image processing parameter adjustment data, and a transmitter for transmitting the image processing parameter adjustment data created by the data creating element to the image processor.

25 Claims, 9 Drawing Sheets

| C = 10, M = 50, Y = 120, K = 0 |
| C = 50, M = 150, Y = 20, K = 0 |
| C = 80, M = 20, Y = 200, K = 0 |
| C = 220, M = 90, Y = 80, K = 0 |
| C = 30, M = 100, Y = 50, K = 0 |

FIG. 5

IMAGE PROCESSOR, IMAGE FORMING APPARATUS, IMAGE FORMING SYSTEM COMPRISING THESE APPARATUSES, COMPUTER-READABLE RECORDING MEDIUM THAT RECORDS IMAGE FORMING PROGRAM, AND IMAGE FORMING METHOD

BACKGROUND OF THE INVENTION

1. Field of the Invention

The present invention pertains to an image processor, an image forming apparatus, an image forming system comprising these apparatuses, a computer-readable recording medium that records an image forming program, and an image forming method.

2. Description of the Related Art

Image forming systems have conventionally existed that can be used in the same manner as copying machines, wherein a scanner that reads an original document is connected to a printer that performs printing, and the original document image data read by the scanner is output by means of the printer. In this type of image forming system, various types of scanner/printer combinations are available, and the user can select the scanner and printer based on the functions and performance desired. In addition, image forming systems exist wherein multiple printers and scanners are connected by means of a network. In these image forming systems, the images read from a certain scanner or images created using a personal computer or other apparatus may be output to various printers.

However, in the conventional image forming systems, because there are various possible scanner/printer combinations, and because different printers have different output characteristics (reproduced gradation, color reproduction, etc.), variations occur in the quality of the output images.

The present invention was created in view of this problem, and an object of the present invention is to eliminate variations in the output image quality that occur due to differences among the printers connected to the image forming system.

According to one aspect of the present invention, an image processor that can communicate with an external image forming apparatus includes instruction means for requesting image processing parameter adjustment data from the external image forming apparatus; receiving means for receiving image processing parameter adjustment data from the external image forming apparatus; and means for performing adjustment of an image processing parameter based on the image processing parameter adjustment data received by the receiving means.

According to another aspect of the present invention, an image forming apparatus that can communicate with an external image processor comprises data creating means for creating image processing parameter adjustment data; and transmission means for transmitting the image processing parameter adjustment data created by the data creating means to the external image processor.

According to another aspect of the present invention, an image forming system comprising includes an image forming apparatus and an image processor. The image processor includes instruction means for requesting image processing parameter adjustment data from the image forming apparatus; receiving means for receiving image processing parameter adjustment data from the image forming apparatus, and image processing means for performing adjustment of an image processing parameter based on the image processing parameter adjustment data received by the receiving means. The image forming apparatus includes data creating means for creating image processing parameter adjustment data, and transmission means for transmitting the image processing parameter adjustment data created by the data creating means to the image processor.

The present invention also relates to a computer-readable recording medium on which is recorded an image forming program for an image forming system comprising an image processor and an image forming apparatus. The image forming program comprises a step whereby the image forming apparatus creates image processing parameter adjustment data, a step whereby the image processor requests the image processing parameter adjustment data from the image forming apparatus, a step whereby the image processing parameter adjustment data is transmitted to the image processor, a step whereby the image processing parameter adjustment data sent from the image forming apparatus is received by the image processor, and a step whereby adjustment of an image processing parameter is performed based on the received image processing parameter adjustment data.

And, an image forming method for an image forming system having an image processor and an image forming apparatus includes the steps of the image forming apparatus creating image processing parameter adjustment data, the image processor requesting the image processing parameter adjustment data from the image forming apparatus, the image processing parameter adjustment data is transmitted to the image processor, the image processing parameter adjustment data sent from the image forming apparatus is received by the image processor, and performing adjustment of an image processing parameter based on the received image processing parameter adjustment data.

In the above descriptions, the image processing parameter may include either a gamma correction table or a color conversion coefficient.

BRIEF DESCRIPTION OF THE DRAWINGS

FIG. 5 is a drawing showing color adjustment patterns.

DETAILED DESCRIPTION OF THE PREFERRED EMBODIMENTS

Figure 1:
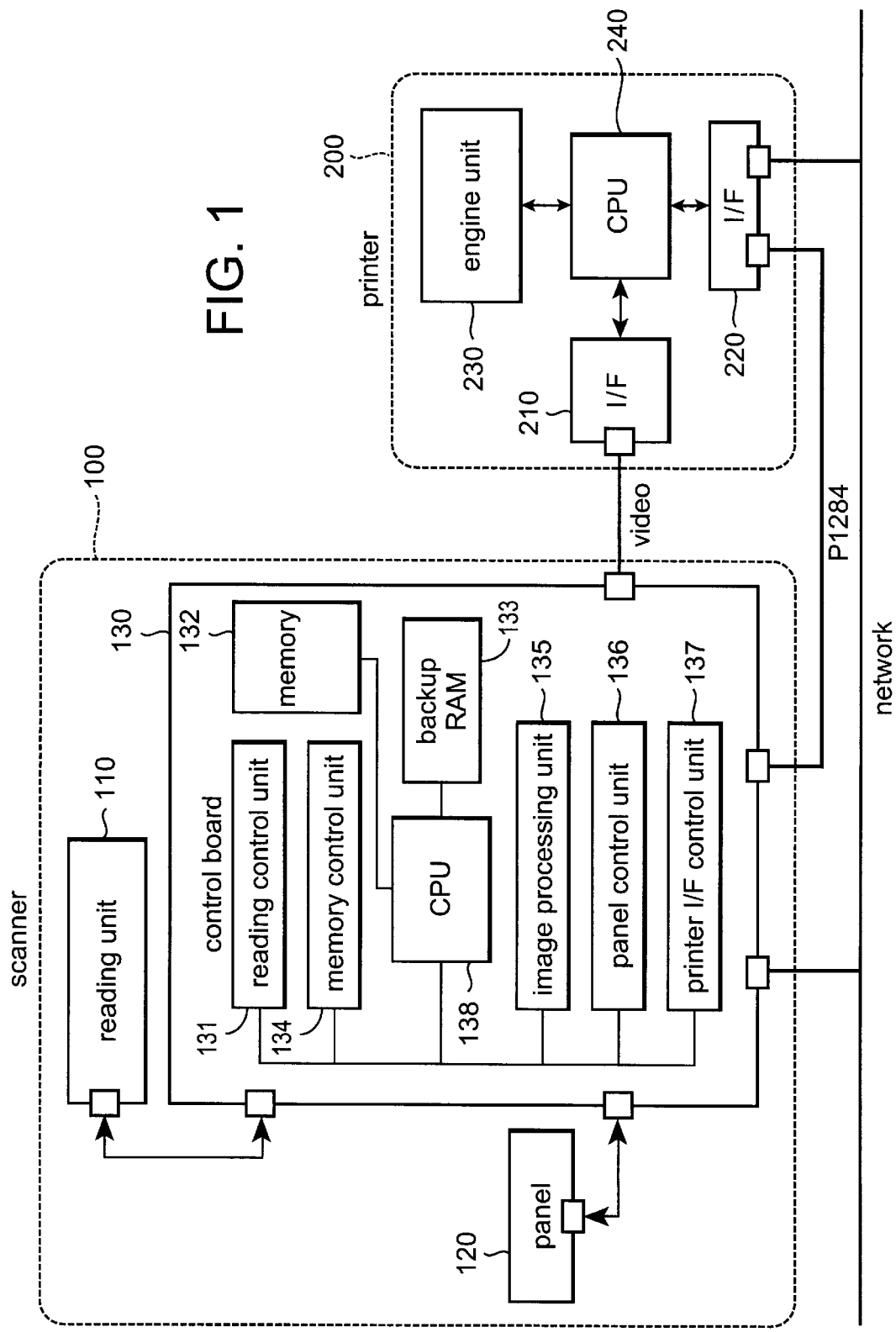
FIG. 1 is a drawing showing the construction of an image forming system comprising one embodiment of the present invention.

FIG. 1 shows the construction of an image forming system comprising a preferred embodiment of the present invention.

This image forming system comprises a scanner 100 and printers 200 connected by means of their respective video interface, P1284 interface and network interface, such that they are capable of bi-directional communication. The original document images are read by a color CCD in the scanner 100 and output as 8-bit R, G, and B image data. After undergoing various processes in an image processor 135 in the scanner 100, such as RGB to YMCK color conversion, the image data is sent to one of the printers 200. Although only one printer is illustrated in FIG. 1, there may be several printers connected to the scanner 100.

The scanner 100 has a reading unit 110 equipped with a color CCD, a panel 120 by which instructions are input by the user, and a control board 130. The control board 130 has a reading control unit 131 that controls the reading unit 110, a memory 132 that temporarily stores the read image data, a backup RAM 133 that stores the image processing parameters, a memory control unit 134 that controls the memory 132 and the backup RAM 133, an image processing unit 135 that performs image processing such as logarithmic conversion (conversion from brightness data to density data), UCR/BP processing (undertone elimination and black ink generation), color conversion (conversion to YMCK printing color data), space filter processing such as smoothing (Moire suppression) and MTF correction (sharpening of character and line images), and gamma correction (linearization of the recording density) appropriate for the output characteristics of the printer 200, a panel control unit 136 that controls the panel 120, a printer interface control unit 137 that controls the printer interface that allows communication with the printer 200, and a CPU 138 that performs overall control of the components described above. The reading unit 110 and the control board 130 are connected through SCSI ports, and the panel 120 and the control board 130 are connected by means of a dedicated interface. The interfaces for each printer comprise all of the interfaces capable of bi-directional communication, such as a P1284 interface, a network interface, and a video interface. The image data that has undergone image processing is transmitted to the printer 200 via the video interface.

Each printer 200 has a video interface 210 and a nonvideo interface 220, each of which is capable of communication with the scanner 100, an engine unit 230 that prints image data received via the video interface 210, and a CPU 240 that performs overall control of the components mentioned above. The engine unit 230 forms images corresponding to each of the colors of yellow (Y), magenta (M), cyan (C) and black (K), which together form a color image.

In the image forming system of the present invention comprising a scanner and printers connected, as described above, image quality data for the images output from the printers 200 is transmitted to the scanner 100, and variations in the image quality of the output images due to differences among the printers 200 are reduced by automatically adjusting the image processing parameters to have the scanner 100 correct the output images based on the data sent from the printer 200.

Figure 2A:
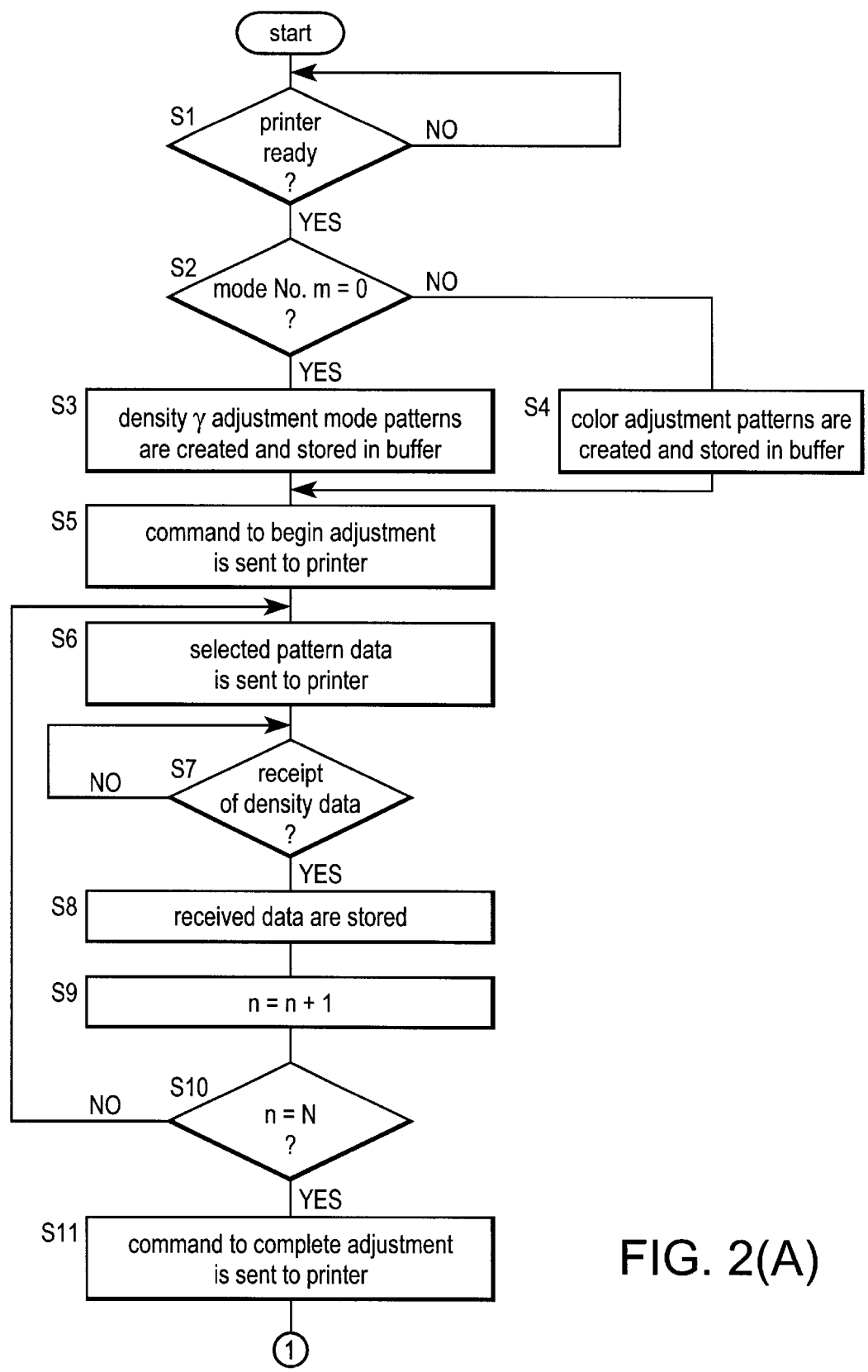
FIG. 2 is a flow chart showing the sequence of an automatic adjustment process in which the present invention is applied.
Figure 2B:
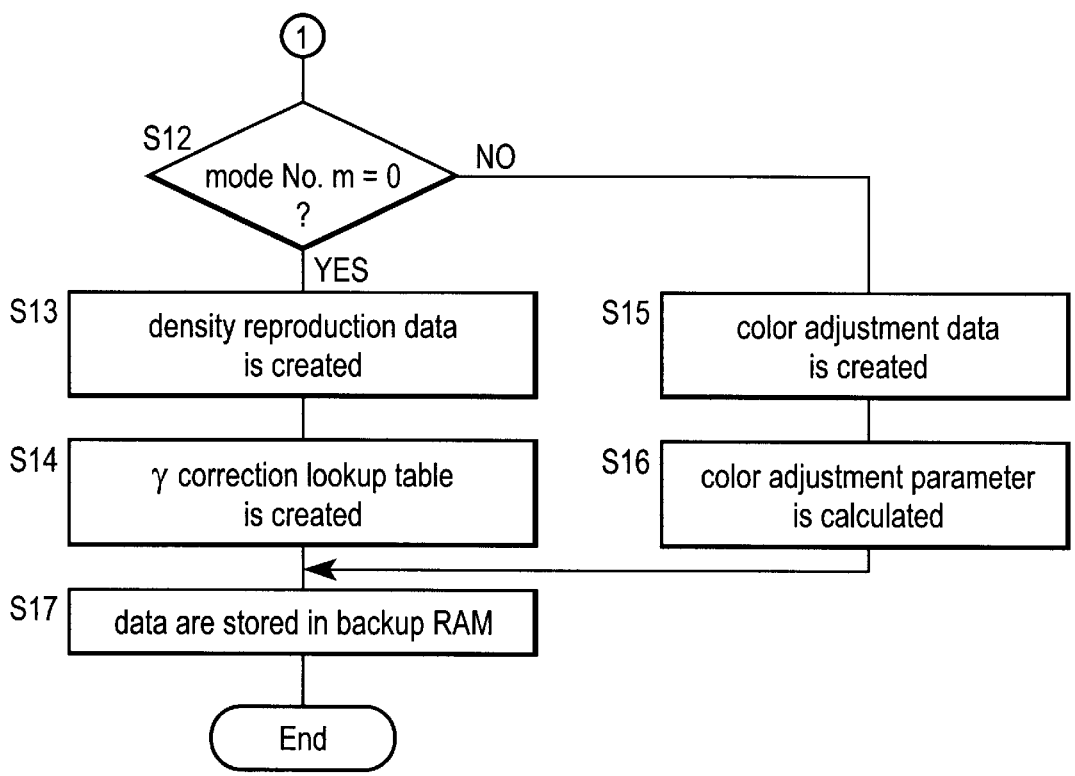

FIG. 2 is a flow chart showing the sequence of the automatic adjustment process. Automatic adjustment is begun by the user executing an instruction to begin from the panel 120 (alternatively, automatic adjustment may be performed at regular intervals). Here, possible automatic adjustment modes provided include density gamma adjustment mode (mode number m=0) to automatically adjust for variations in the reproduced density gradation due to differences among the printers, and color adjustment mode (mode number m=1) to automatically adjust for variations in color reproduction. The mode number m may be set by an operator using the panel 20. The mode number m change is implemented by the CPU 138.

The mode number m may be set by an operator using the panel 120. The mode number m change is then implemented by the CPU 138.

When an instruction to begin automatic adjustment is issued, the CPU 138 of the scanner 100 determines from the result of communication with the printer 200 whether or not printer initialization has been completed (step S1). If the answer is NO, the CPU 138 waits until initialization of printer 200 is completed, and if the answer is YES, it proceeds to the next step, step S2.

Figure 3:
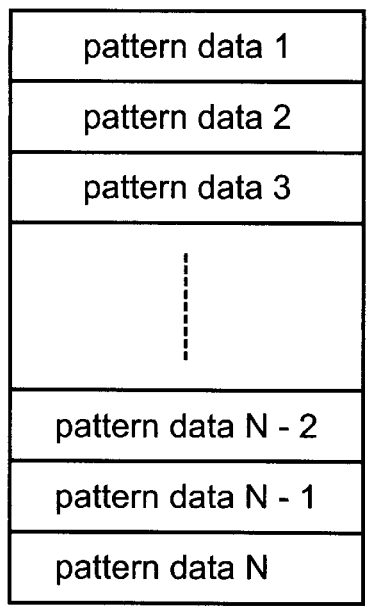
FIG. 3 is a drawing showing a pattern data buffer.
Figure 4:
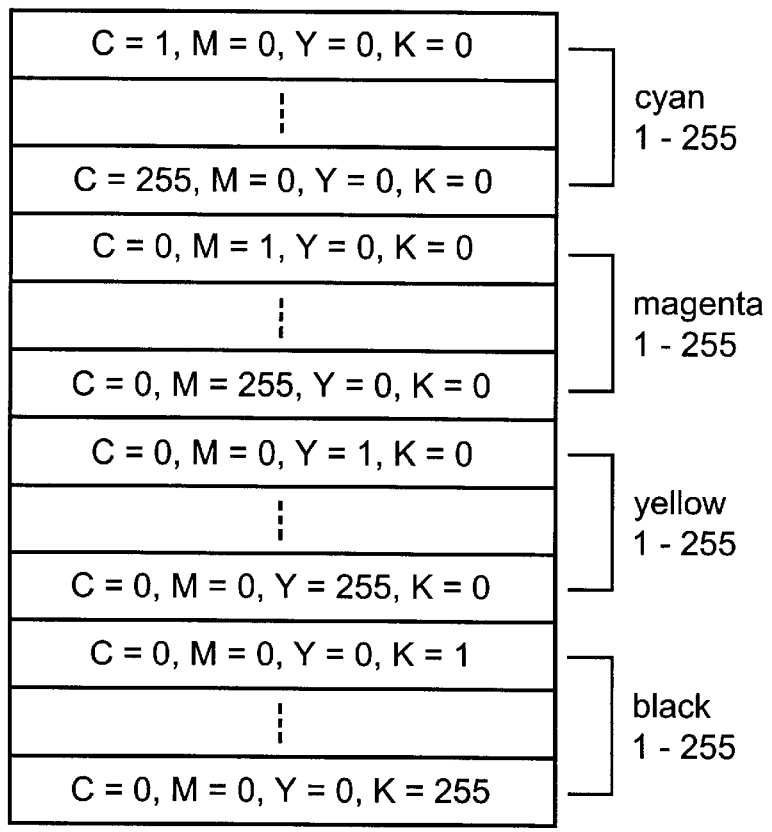
FIG. 4 is a drawing showing density gamma adjustment patterns.

In step S2, it is determined whether the active automatic adjustment mode is density gamma adjustment mode or color adjustment mode. If the active mode is density gamma adjustment mode (YES in step S2), the density gamma adjustment mode patterns shown in FIG. 4 are created and stored in the pattern data buffer in the memory 132 (step S3) (see FIG. 3). The density gamma adjustment patterns comprise pattern data comprising combinations of C, M, Y and K values each ranging from the smallest (1) to the largest (255). If the active mode is the color adjustment mode (NO in step S2), the color adjustment patterns shown in FIG. 5 are created and stored in the pattern data buffer in the memory 132 (step S4). The color adjustment patterns consist of pattern data comprising N different combinations of random C, M and Y values. When the storage of pattern data in either step S3 or step S4 is completed, the command to begin automatic adjustment is sent to the printer 200 (step S5), and one item of pattern data is selected in step S6 in accordance with the sequence of pattern data items (pattern 1 to pattern N) set in step S3 or step S4. In step S7, the CPU 138 waits for receipt of the density data created by the printer 200 in accordance with the pattern data sent in step S6 and sent to the printer 200.

On the other hand, if the printer 200 is an electrophotographic printer, a toner image is formed on the photoreceptor based on the received pattern data, the toner image is read by a density detection sensor not shown in the drawings, and density data is thereby obtained. This density data is then sent to the scanner 100. However, if the printer 200 is an inkjet printer or a thermal transfer printer, the pattern may be created on paper and the density data for this pattern obtained.

When the scanner 100 receives the density data from the printer 200 (YES in step S7), the density data is stored in the memory 132 (step S8), and the pattern data number n is incrementally increased (step S9). In step S10, it is determined whether the density data for the final pattern data item N has been stored. If the answer in step S10 is NO, the CPU 138 returns to step S6 and the density data for the next pattern data is obtained. If the answer is YES, this means that the density data for all of the pattern data has been obtained, and the command to complete automatic adjustment is sent to the printer 200 (step S11).

After the density data for all of the pattern data is obtained in this way, in step S12, it is determined whether the active automatic adjustment mode is density gamma adjustment mode or color adjustment mode. If it is density gamma adjustment mode (YES in step S12), density reproduction data is created from the density data (step S13), and a new gamma correction lookup table that comprises the image processing parameter is calculated (step S14) so that the printer input values and the read density have a linear relationship, as shown in FIG. 7(C).

If the active automatic adjustment mode is color adjustment mode (NO in step S12), color adjustment data is created (step S15) and a color adjustment parameter that comprises the image processing parameter is calculated from the color adjustment data (step S16). The processes of steps S13 through S16 are explained in further detail below. The image processing parameters calculated in steps S14 and S16 are stored in the backup RAM 133 (step S17).

Figure 6:
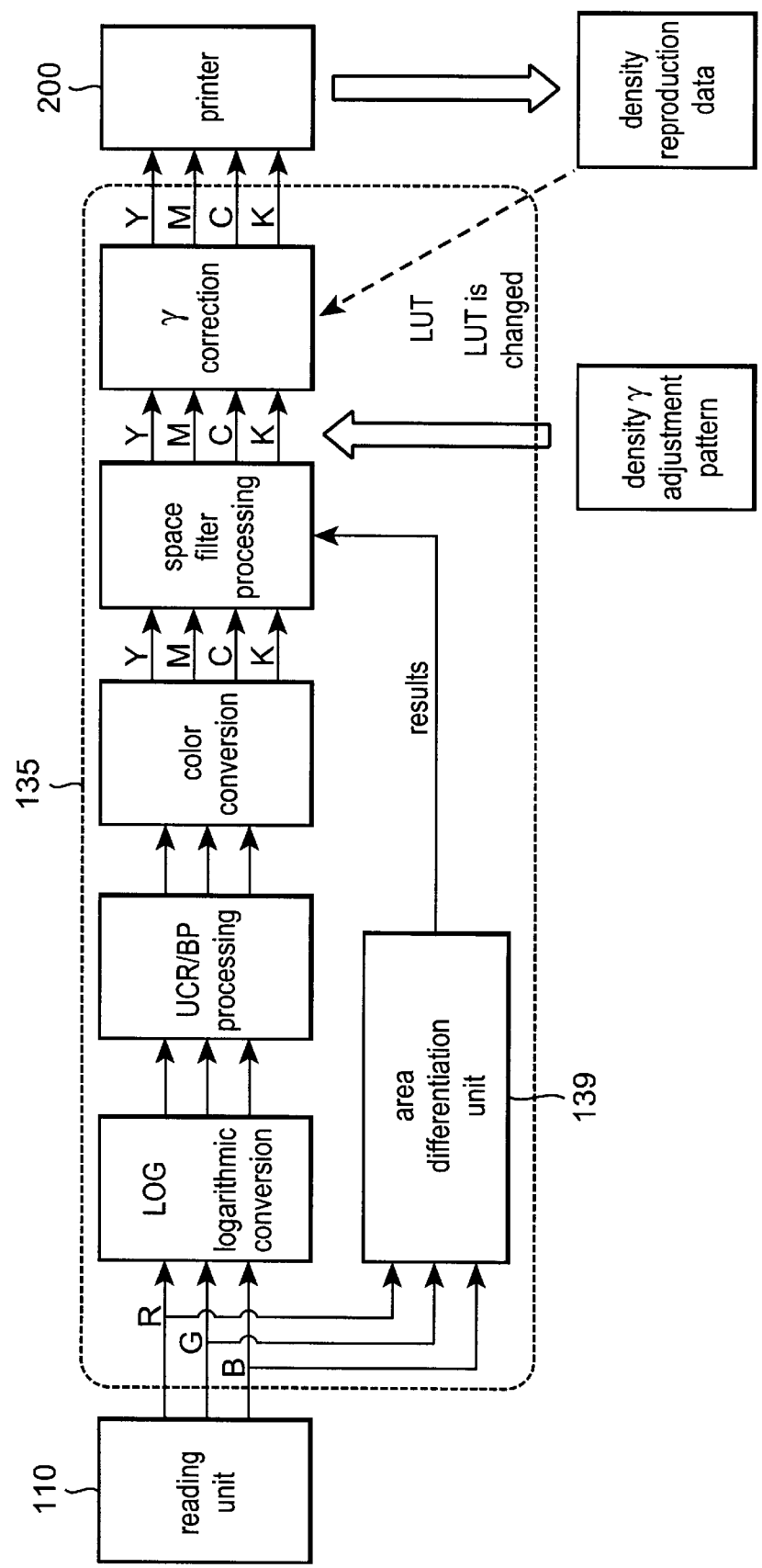
FIG. 6 is a block diagram showing the construction of an image processing unit when density gamma adjustment mode is active.

FIG. 6 is a block diagram showing the construction of the image processing unit 135 where the active automatic adjustment mode is the density gamma adjustment mode (m=0) as shown in the flow chart referred to above. The image processing sequence where the density gamma adjustment mode is active will be explained below with reference to FIG. 6.

The 8-bit R, G, and B image data read and output by the reading unit 110 is stored in the memory 132 in the control board 130. The R, G, and B image data is then read out from the memory 132 synchronously with each of the YMCK color images printed by the printer 200, and after logarithmic conversion (conversion from brightness data to density data), UCR/BP processing (undertone elimination and black ink generation), and color conversion (conversion to YMCK printing color data) are performed, space filter processing such as smoothing (Moire suppression) and MTF correction (sharpening of character and line images), and gamma correction (linearization of the recorded density) appropriate for the output characteristics of the printer 200 are performed by the image processing unit 135. On the other hand, the R, G, and B data read out from the memory 132 is input to an area differentiation unit 139 and area differentiation to distinguish between character areas and photo areas, for example, is performed. Based on the results of this differentiation, the relative amounts of smoothing and MTF correction are alternated for each area, thereby improving image sharpness. The image data processed in this way is input into the printer 200 via the prescribed printer interface, and printing is performed.

If the density gamma adjustment mode is active, as described above, the scanner 100 outputs the density gamma adjustment data shown in FIG. 4 to the printer 200 (steps S5 through S11), creates density reproduction data from the density data received from the printer 200 (step S13), and changes the gamma correction lookup table (LUT) so that this density reproduction data will exhibit a linear relationship between the printer input values and the read density (S14).

Figure 7A:
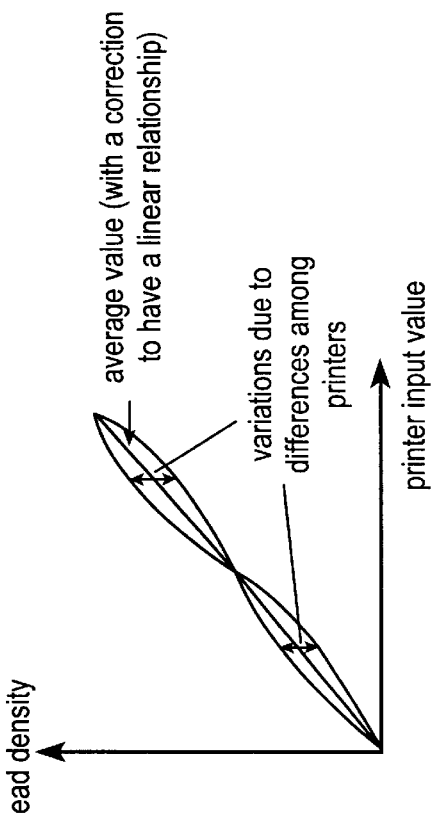
FIGS. 7(A), 7(B), and 7(C) are graphs showing an example of printer density reproduction data and of linearization via automatic adjustment.
Figure 7B:
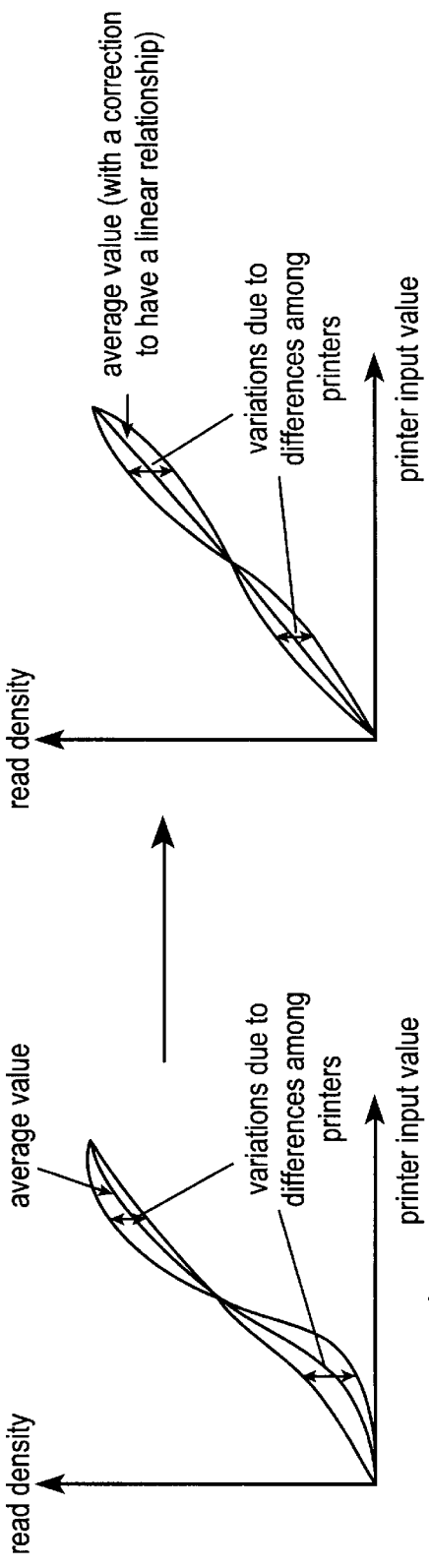
Figure 7C:
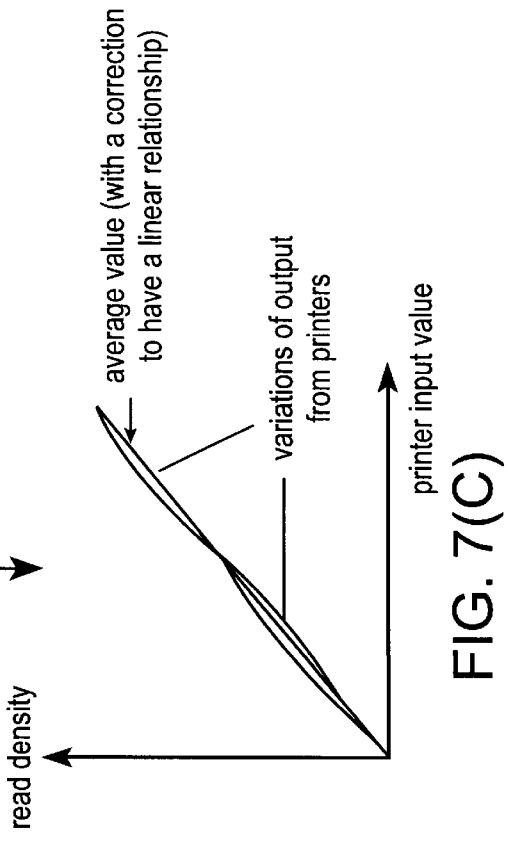

FIGS. 7(A), 7(B), and 7(C) are graphs showing an example of the density reproduction data obtained from the printer and the linearization performed during automatic adjustment.

As shown in FIG. 7(A), the image density reproduced (read density) generally does not have a linear relationship to the original document density to be reproduced (printer input values). This nonlinearity varies among printers, and variations in density and color are particularly marked in low-density areas. If gamma correction that is adjusted so as to satisfy linearity of only the average values in the drawing is performed with regard to the printer characteristics shown in FIG. 7(A), the result shown in FIG. 7(B) is obtained, and variations due to differences among printers remain. In the present invention, the settings of the scanner 100 are corrected so that the output from each printer 200 will exhibit a linear relationship between the printer input values and the read density. By performing this automatic adjustment for each printer 200 as described above, as shown in FIG. 7(C), image reproduction is attained that comes very close to satisfying this linearity criterion at all times regardless of the differences among the printers 200, and variations in the output image quality that occur due to differences among conventional printers, printer changes over time and replacement of consumable parts are reduced.

Figure 8:
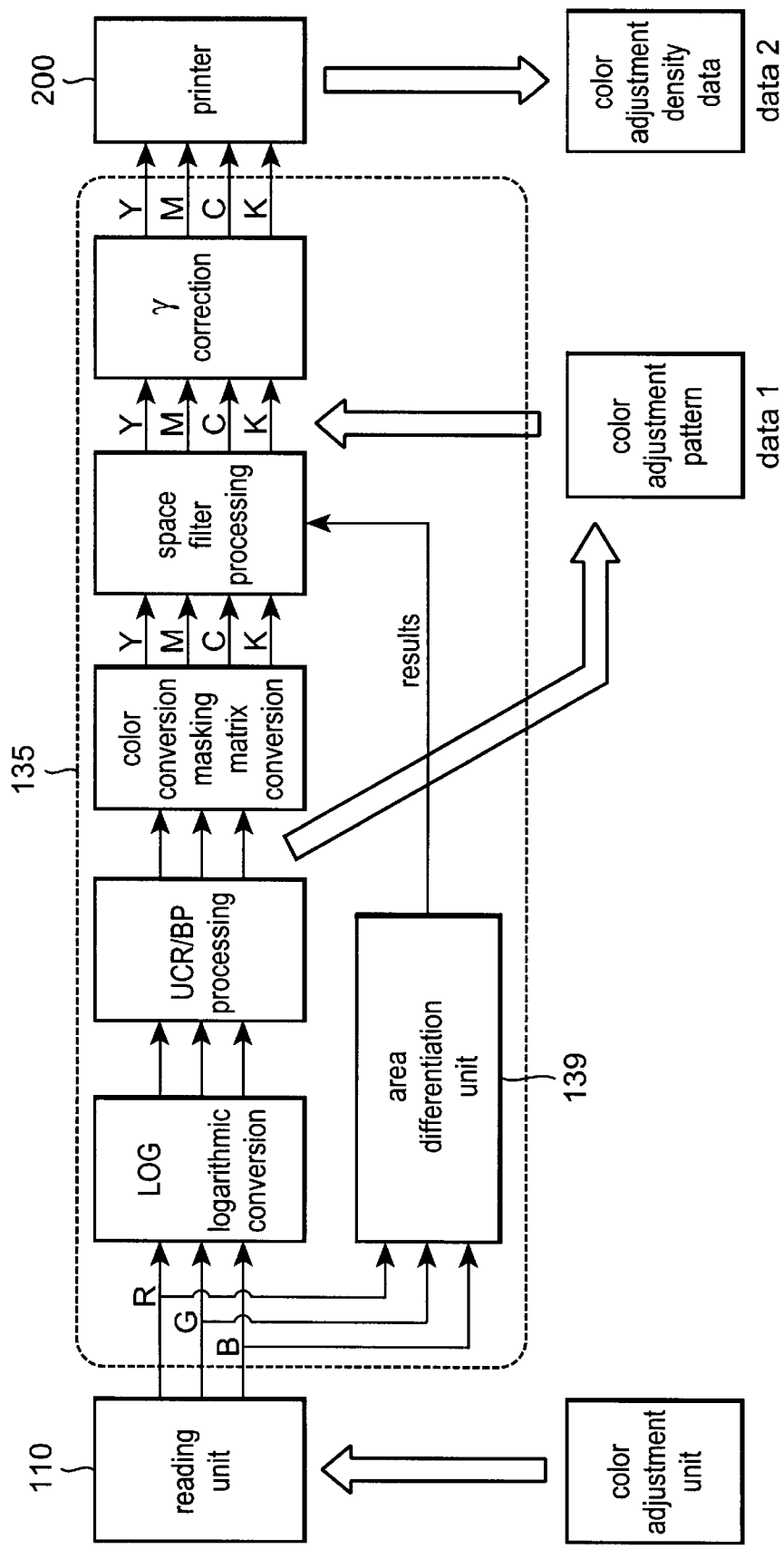
FIG. 8 is a block diagram showing the construction of the image processing unit when color adjustment mode is active.

FIG. 8 is a block diagram showing the construction of the image processing unit 135 where the active automatic adjustment mode is the color adjustment mode (m=1) as shown in the above flow chart. The image processing sequence where the color adjustment mode is active will be explained below with reference to FIG. 8.

This image processing sequence is basically identical to that shown in FIG. 6. In other words, the 8-bit R, G, and B image data read and output by the reading unit 110 is stored in the memory 132 in the control board 130. The R, G, and B image data is then read out from the memory 132 synchronously with the YMCK color images printed by the printer 200, and after logarithmic conversion, UCR/BP processing and color conversion masking matrix conversion are performed, space filter processing such as smoothing and MTF correction and gamma correction appropriate for the output characteristics of the printer 200 are performed by the image processing unit 135. On the other hand, the R, G, and B data taken out from the memory 132 is input to the area differentiation unit 139 and area differentiation to distinguish among character areas and photo areas, for example, is performed. Based on the results of this differentiation, the relative amounts of smoothing and MTF correction are alternated for each area, thereby improving image sharpness. The image data processed in this way is input into the printer 200 via a prescribed printer interface, and printing is performed.

If the color adjustment mode is active, as described above, the scanner 100 outputs the color adjustment patterns to the printer 200 (steps S5 through S11), creates color adjustment data from the density data received from the printer 200 (step S15), and changes the color adjustment parameter using this color adjustment data (step S16).

Specifically, the color adjustment chart (a chart in which each of YMCK colors has a linear relationship to the density) is read by the reading unit 110, R, G and B average values are calculated for each patch, and data (color adjustment pattern) is created by performing logarithmic conversion and UCR/BP processing to all of the data (step S4). The data obtained from the logarithmic conversion and UCR/BP processing is termed Data 1 (DR, DG, DB).

This Data 1 is then output to the printer 200 in accordance with the sequence outlined in the flow chart of FIG. 2 (steps S5 through S11), and color adjustment density data is thereby obtained (step S15). This data is termed Data 2.

The color conversion masking matrix is then sought using the smallest square method so that the error between Data 1 and Data 2 will be the smallest (step S16). In other words, A is sought that makes the error between AX and Y the smallest when AX=Y, Data 1 is X and Data 2 is Y in the equation 1 below (color conversion masking matrix conversion equation).

Namely, the equation 2 below is obtained using smallest square method curve-fitting.

Equation 1:

$$\begin{pmatrix} M11 & M12 & M13 & M14 & M15 & M16 & M17 & M18 & M19 \\ M21 & M22 & M23 & M24 & M25 & M26 & M27 & M28 & M29 \\ M31 & M32 & M33 & M34 & M35 & M36 & M37 & M38 & M39 \end{pmatrix} \begin{pmatrix} DR \\ DG \\ DG \\ \frac{DR \times DG}{256} \\ \frac{DG \times DB}{256} \\ \frac{DR \times DB}{256} \\ \frac{DR^2}{256} \\ \frac{DG^2}{256} \\ \frac{DB^2}{256} \end{pmatrix} = \begin{pmatrix} C \\ M \\ Y \end{pmatrix}$$

Equation 2:

$$\sum_{i=0}^{n} \left\{ \begin{array}{l} Ci - (M11 \times X1_i + M12 \times X2_i + M13 \times X3_i + M14 \times X4_i + M15 \times X5_i + \\ M16 \times X6_i + M17 \times X7, + M18 \times X8_i + M19 \times X9_i) \end{array} \right\}^2$$

M11 through M19 that will make the result of this equation 2 the smallest are then sought. M21 through M29 and M31 through M39 are sought in the same manner and deemed the color conversion masking coefficients.

Figure 9:
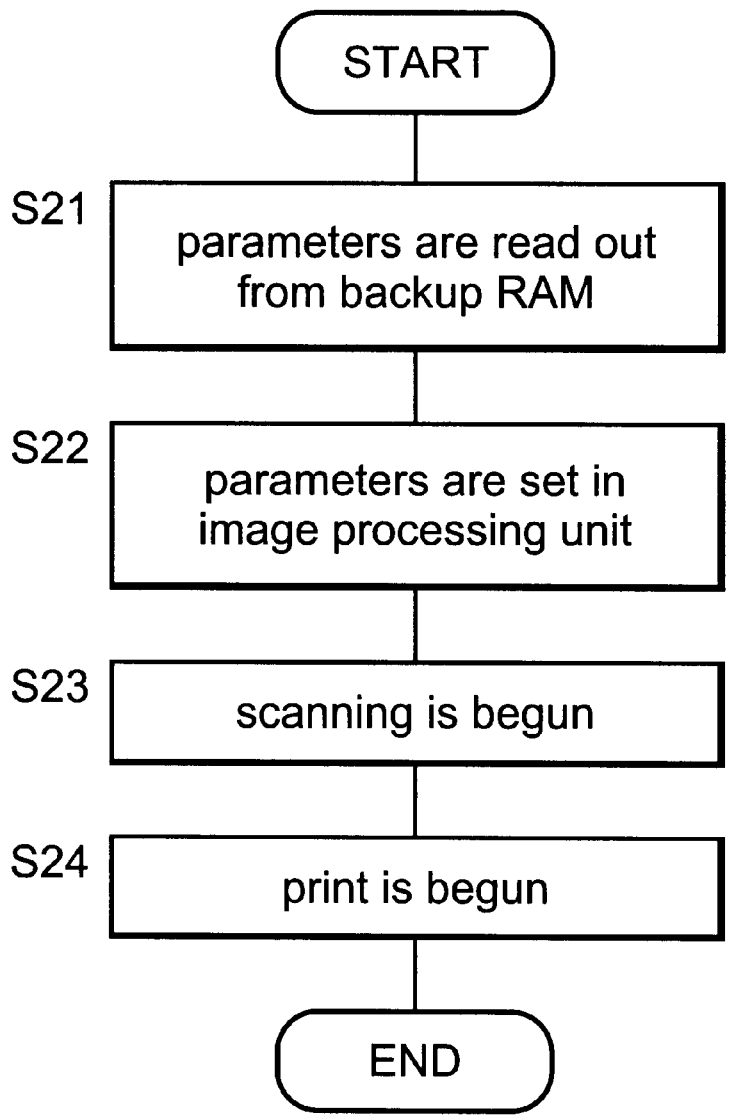
FIG. 9 is a flow chart showing the sequence of the copying operation after automatic adjustment.

FIG. 9 is a flow chart showing the sequence of the copying operation after automatic adjustment.

When the user issues a copy instruction via the panel 120, the CPU 138 of the scanner 100 reads the image processing parameter stored in the step S17 described above from the backup RAM 133 (step S21) and sets the read parameter in the image processing unit 135 (step S22). It then begins scanning by means of the reading unit 110 to read the original document, and processes the image data obtained by means of the image processing unit 135 in which the new parameter is set (see FIGS. 6 and 8) (step S23). The processed image data is input to the printer 200 via the prescribed printer interface, whereby printing is begun (step S24).

Therefore, using this embodiment, the scanner 100 calculates and stores the scanner image processing parameter for density gamma adjustment or color adjustment and performs image processing using the current scanner image processing parameter when copying is begun. Consequently, the variations in the reproduced gradation and color reproduction that occur due to the differences among printers 200 may be automatically adjusted for on the side of the scanner 100 such that more precise correction is possible and variations in output image quality are further reduced.

In addition, not only the variations in output image quality due to the differences among printers 200, but also the variations in output image quality that occur due to changes in the printers 200 over time or to the replacement of consumable parts may be adjusted for in the same manner. The variations in output image quality are further reduced from this perspective as well.

Further, even where different combinations are used for the scanner 100 and printers 200, the automatic adjustment described above is applicable to reduce the variations in output image quality.

Moreover, where image processing is performed using a personal computer and the image data is output to printers 200, adjustment for the differences among the printers 200 may be performed.

The automatic adjustment by the scanner 100 is performed by the CPU 138 executing a prescribed program that describes the processing sequence described above. This prescribed program is provided in the form of a computer-readable recording medium (floppy disk or CD-ROM, for example). This prescribed program may be provided on its own as application software that executes the processing explained above or may be incorporated in the scanner software as one of the scanner functions. This applies where the output from the scanner undergoes image processing by means of a personal computer and is then output to the printers.

As explained above, using the present invention, adjustment of image processing parameters is performed in the image processor, and therefore, variations in the reproduced gradation and color reproduction due to the different characteristics of the image forming apparatuses may be automatically adjusted for on the side of the image processor, whereby more precise correction may be performed and the variations in output image quality are further reduced. The variations in output image quality due to changes in the image forming apparatuses over time in the market or to replacement of consumable parts may also be automatically adjusted for.

While particular embodiments of the present invention have been illustrated and described herein, the scope of this patent is not limited to the particular illustrated embodiments. The scope of the patent shall be defined by the following claims and equivalents thereto.

What is claimed is:

1. An image processor that can communicate with an external image forming apparatus, the image processor comprising:

instruction means that requests image processing parameter adjustment data from the external image forming apparatus;

transmission means that transmits pattern data to the external image forming apparatus;

receiving means that receives image processing parameter adjustment data from the external image forming apparatus wherein the image processing parameter adjustment data is created based on the pattern data; and means for performing adjustment of an image processing parameter based on the image processing parameter adjustment data received by the receiving means.

2. The image processor claimed in claim 1, wherein the image processor comprises a scanner.

3. The image processor claimed in claim 1, wherein the image processing parameter comprises a gamma correction table.

4. The image processor claimed in claim 1, wherein the image processing parameter comprises a color conversion coefficient.

5. An image forming apparatus that can communicate with an external image processor, the image forming apparatus comprising:

means for receiving pattern data from the external image processor and an image is formed based on the received pattern data;

sensor for sensing a density of the image that is formed;

data creating means for creating image processing parameter adjustment data based on the sensed density; and transmission means that transmits the image processing parameter adjustment data created by the data creating means to the external image processor.

6. The image forming apparatus claimed in claim 5, wherein the image processing parameter comprises a gamma correction table.

7. The image forming apparatus claimed in claim 5, wherein the image processing parameter comprises a color conversion coefficient.

8. An image forming apparatus that can communicate with an external image processor, the image forming apparatus comprising:

means for receiving pattern data from the external image processor;

means for forming a pattern image based on the received pattern data;

means for sensing the pattern image;

data creating means for creating print characteristic data based on the sensing results; and means for transmitting the print characteristic data created by the data creating means to the external image processor; and means for receiving image data that has been corrected by the external image processor in view of the print characteristic data transmitted to the external image processor.

9. The image forming apparatus claimed in claim 8, wherein the printing characteristic data relates to gamma correction.

10. The image forming apparatus claimed in claim 8, wherein the printing characteristic data relates to a color conversion coefficient.

11. An image forming system comprising:

an image forming apparatus;

an image processor, the image processor includes:
instruction means for requesting image processing parameter adjustment data from the image forming apparatus;
transmission means for transmitting pattern data to the external image forming apparatus;
receiving means that receives image processing parameter adjustment data from the image forming apparatus, and
image processing means that performs adjustment of an image processing parameter based on the image processing parameter adjustment data received by the receiving means, and the image forming apparatus includes:
forming means for forming a pattern image based on the pattern data;
detecting means for detecting the pattern image;
data creating means that creates image processing parameter adjustment data in view of the detecting result of the pattern image, and
transmission means that transmits the image processing parameter adjustment data created by the data creating means to the image processor.

12. The image forming system claimed in claim 11, wherein the image processing parameter comprises a gamma correction table.

13. The image forming system claimed in claim 11, wherein the image processing parameter comprises a color conversion coefficient.

14. An image forming system comprising:

a plurality of image forming apparatus;

an image processor, the image processor includes:
instruction means for requesting image processing parameter adjustment data from a selected one of the image forming apparatus;
transmission means for transmitting pattern data to the selected one of the image forming apparatus;
receiving means for receiving image processing parameter adjustment data from the selected image forming apparatus, and
image processing means for performing adjustment of an image processing parameter based on the image processing parameter adjustment data received by the receiving means, and each of the image forming apparatus includes:
means for forming a pattern image based on the pattern data;
detecting means for detecting the pattern image;
data creating means for creating image processing parameter adjustment data in view of the detecting result of the pattern image, and
transmission means for transmitting the image processing parameter adjustment data created by the data creating means to the image processor.

15. The image forming system claimed in claim 14, wherein the image processing parameter comprises a gamma correction table.

16. The image forming system claimed in claim 14, wherein the image processing parameter comprises a color conversion coefficient.

17. A computer-readable recording medium on which is recorded an image forming program for art image forming system comprising an image processor and an image forming apparatus, the image forming program comprising:

a step whereby the image forming apparatus receives pattern data from the image processor, a step whereby the image forming apparatus creates image processing parameter adjustment data based on the received pattern data, a step whereby the image processor requests the image processing parameter adjustment data from the image forming apparatus, a step whereby the image processing parameter adjustment data is transmitted to the image processor, a step whereby the image processing parameter adjustment data sent from the image forming apparatus is received by the image processor, and a step whereby adjustment of an image processing parameter is performed based on the received image processing parameter adjustment data.

18. The computer-readable recording medium as claimed in claim 17, wherein the image processing parameter comprises a gamma correction table.

19. The computer-readable recording medium as claimed in claim 17, wherein the image processing parameter comprises a color conversion coefficient.

20. The computer-readable recording medium of claim 17, wherein the image forming apparatus forms an image based on the pattern data and the image processing parameter adjustment data is based on the formed image.

21. An image forming method for an image forming system having an image processor and an image forming apparatus, said image forming method comprising the steps of:

the image forming apparatus receiving pattern data from the image forming apparatus, the image forming apparatus creating image processing parameter adjustment data based on the received pattern data, the image processor requesting the image processing parameter adjustment data from the image forming apparatus, the image processing parameter adjustment data is transmitted to the image processor, the image processing parameter adjustment data sent from the image forming apparatus is received by the image processor, and performing adjustment of an image processing parameter based on the received image processing parameter adjustment data.

22. The image forming method claimed in claim 21, wherein the image processing parameter comprises a gamma correction table.

23. The image forming method claimed in claim 21, wherein the image processing parameter comprises a color conversion coefficient.

24. The image forming method claimed in claim 21, further comprising the step of the image forming apparatus forming an image based on the received pattern data, and wherein the image processing parameter adjustment data is based on the formed image.

25. An image forming method, comprising the steps of:

an image forming apparatus receiving pattern data from an external image processor;

transmitting print characteristic data from the image forming apparatus to the external image processor, wherein the print characteristic data is based on the pattern data;

the image forming apparatus receiving image data that has been corrected by the external image processor in view of the print characteristic data transmitted to the external image processor; and the image forming apparatus printing an image using the corrected image data.

* * * * *